May 23, 1950  T. E. LEGGE  2,508,614
JIG FOR USE IN SHAPING TUBULAR AND THE LIKE STOCK
Filed Dec. 14, 1944  2 Sheets-Sheet 1

Inventor.
Thomas E. Legge
Rowland V. Patrick
by
Attorney.

Inventor.
Thomas E. Legge
by Rowland V. Patrick
Attorney.

Patented May 23, 1950

2,508,614

UNITED STATES PATENT OFFICE 2,508,614

JIG FOR USE IN SHAPING TUBULAR AND THE LIKE STOCK

Thomas E. Legge, Suncook, N. H.

Application December 14, 1944, Serial No. 568,187

2 Claims. (Cl. 29—67)

This invention relates to the formation of angular joints in tubular and the like stock and is concerned particularly with a compact jig adapted for use in precision shaping separate pieces of stock in preparation for their assembly in tight smooth-surfaced jointed relation.

The invention finds particular use in connection with the preparation for jointing of thin walled tubular metal stock but it has equal applicability to the shaping of solid metal rod stock and non-metallic stock, tubular or solid.

The jig is adapted particularly for use in cutting stock preparatory to the formation of what may be termed V-plate T and cross joints, and will be described with relation to such joints, for which purpose reference is made to the accompanying drawings, in which.

Figure 1:
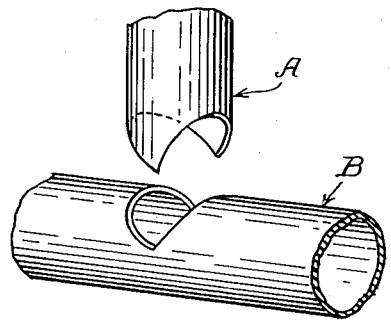
Fig. 1 is a perspective view of separately pre-shaped pieces of stock in position ready for assembly into one of the simpler types of joint.
Figure 2:
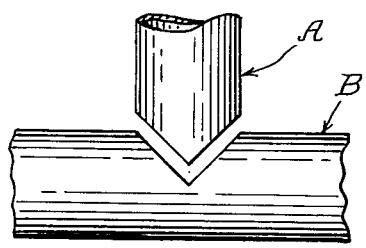
Fig. 2 is a side elevation of the same pieces of stock in a similar position.
Figure 3:
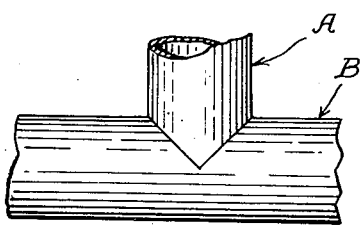
Fig. 3 is a side elevation of the same pieces of stock in assembled relation.
Figure 5:
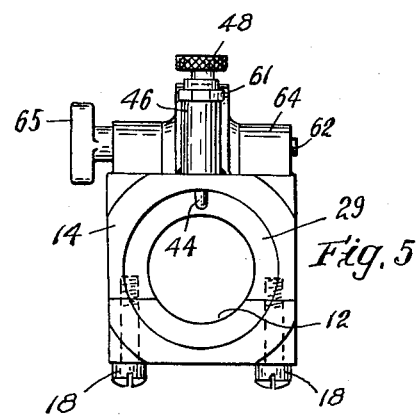
Fig. 5 is an end elevation of the jig with one part thereof detached.

As shown in Figs. 1–3, the simplest joint is formed by pre-shaping one end of a piece of cylindrical tubular metal stock to form a V-shaped male member A, and assembling said male member with a pre-shaped female member B having a V-shaped cut-out portion intermediate its ends. These members A and B are assembled with their prepared edges abutted and are soldered or welded into place to form a T joint as shown in Fig. 3.

In order to pre-shape the members A and B in such manner that they will form a tight precision joint without rough internal and external surfaces, it is necessary that the members be cut with precision. A particular instance where such surfaces are demanded is in the construction of electronic conducting tubes. Provision of smooth surfaces on such tubes is of such great importance in this use that the male and female members are now cut on milling machines. Milling work is relatively expensive, requiring the services of skilled operators and machines which should be available for more complicated jobs. Also, milling machines are not readily available in the field and therefore repair or replacement work may be subject to serious delay.

The jig of this invention is particularly designed for use in precision manufacture of this type of jointed tube. The jig permits pre-shaping of the parts with as much precision as secured by a careful milling operation, but without calling for skilled labor, and the jig and tools required in the operation are small enough to be carried into the field in any repair kit.

As shown in Figs. 4–7, the jig is formed of a suitable size brass, steel or other metal block 10 having a longitudinal cylindrical bore 12 extending therethrough. In the form shown in the drawings, the block 10 is composed of separate upper and lower sections 14 and 16 respectively, bolted together as by bolts 18. This double construction is resorted to for a purpose to be later described. It is of course understood that the block 10 may be composed of a single solid piece provided with the bore.

In the upper surface of block 10, there is provided a V-shaped recess formed by two opposed flat cutting bed surfaces 20 and 22 lying in planes perpendicularly related to one another. These cutting bed surfaces are each formed of case-hardened steel and may be screwed to the block 10 as indicated in Fig. 4.

Figure 4:
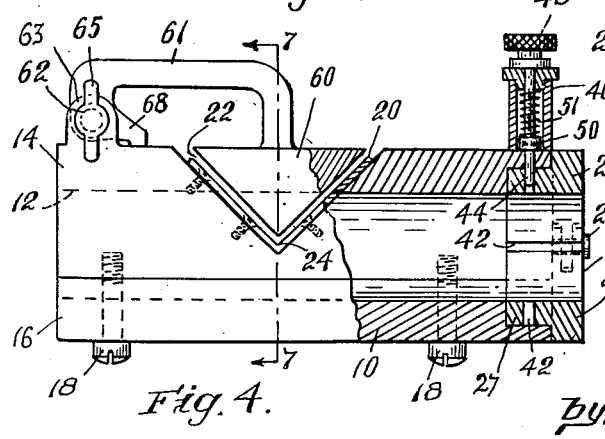
Fig. 4 is a side elevation of the jig of this invention with a portion thereof broken away to illustrate cross-sectional features of the construction.

As clearly shown in Fig. 4, the surfaces 20 and 22 meet along a line 24 perpendicularly intersecting the axis of the bore 12. Each of the bed plates 20 and 22 is also shaped to conform to the contour of the bore and therefore permit the insertion of stock to be shaped through the block from one end to another, in which position its surface will abut the edges of the cut-out portions of the cutting beds 20 and 22.

Figure 6:
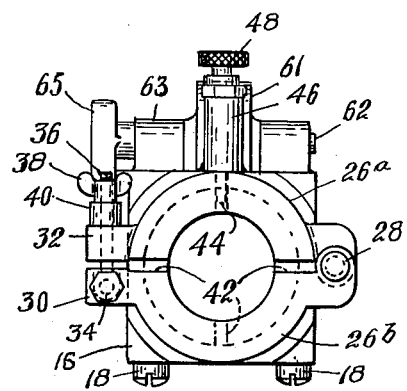
Fig. 6 is an end elevation of the complete jig.
Figure 7:
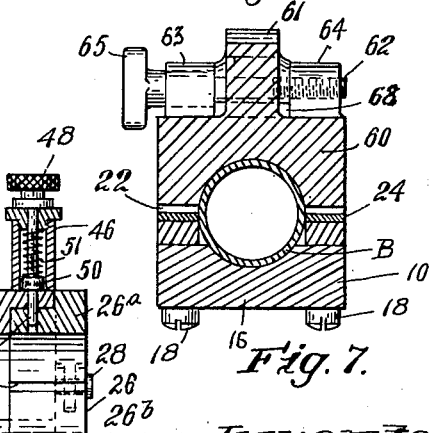
Fig. 7 is a cross-sectional view taken along the line 7—7 of Fig. 4.

In order to hold a piece of stock in position for a cutting operation, the jig is provided at the right hand end thereof with a clamp 26. As shown in Fig. 6 this clamp 26 encircles the bore 12 and has a sleeve portion 27 seated in an annular recess 29 formed in the end of the block 10.

The clamp 26, including the sleeve portion 27, is formed of semi-circular sections 26a and 26b which are hinged at 28. Diametrically opposed to the hinge 28, each section 26a and 26b is provided with bifurcated lugs 30 and 32. The lugs 30 of section 26b carry a pin 34 on which is pivoted a rod 36 which is screw-threaded at its remote end and carries a wing nut 38 and a washer 40. By loosening the wing nut 38, the rod 36 may be pivoted from between the bifurcated lug 32 of section 26a, thereby permitting the sections 26a and 26b to be pivoted around the hinge 28 to enlarge the internal bore thereof. Conversely, tightening of the wing nut 38 in the position shown in Fig. 6 will result in moving the sections 26a and 26b together in a position to firmly clamp a piece of cylindrical stock inserted longitudinally into the bore.

In order to permit the clamp 26 to be held against rotation relative to the block 10, its sleeve 27 is provided with a series of radial holes and recesses 42, spaced at 90° intervals. Two of these coincide with the spaces between the sections 26a and 26b. These recesses and holes 42 constitute one portion of a locking means having as a cooperating portion an index finger 44 mounted on block 10 in a housing 46.

The end of the indexing finger 44 extends out of the housing 46 and is provided with a manually accessible knob 48 for moving the indexing finger from a position extending into one of the recesses 42, upwardly out of such recess so that the clamping member 26 may be rotated relative to or removed from the block 10.

For the purpose of preventing accidental displacement of the indexing finger, it carries a collar 50 and a spring 51 is seated between the collar 51 and the top of the housing 46 in such manner as to yieldably urge the indexing finger into the position shown in Fig. 4.

It will be understood that, if necessary, a duplicate indexing mechanism may be mounted on the block in a position diametrically opposed to the housing 46, although I have found that the single indexing finger is sufficient.

I have also shown in Fig. 4 an accessory comprising a pivoted V-shaped guide 60 mounted on an arm 61 carried by a rod 62 passing through lugs 63 and 64 fixedly secured to block 10. The rod 62 is provided at one end with a wing nut 65 and is screw-threaded at the other end to cooperate with threads in the lug 64 in order to permit ready removal of the guide 60, use of which is entirely optional. The arm 61 is also provided with a stop 68, shown in Fig. 4, which strikes the surface of the block 10 to limit the clockwise pivotal movement of the guide 60 to the position shown in Fig. 4 with its V-shaped surfaces parallelly related to, but spaced from, the cutting bed surfaces 20 and 22. It is understood that the guide member can be pivoted by a counter-clockwise movement out of the recess.

A jig thus constructed may be used in shaping tubular stock to the form of piece A shown in Figs. 1–3, as follows: The stock, which is of a cross-sectional dimension to fit the bore 12 of the jig snugly, is inserted into the bore while the clamp sections 26a and 26b are in loosened position. When the stock has been brought to a proper position relative to the cutting beds, the clamp is tightened. The clamp is then rotated until the index finger 44 locks the clamp with its sleeve 27 axially abutting the annular recess wall of block 10. The stock is thus held against rotation and in predetermined axial relation to the cutting bed 20.

A hacksaw may then be used to make a cut along the cutting bed 20 and guided by its surface until the cut reaches diametrically opposed points in the surface of the stock along the line 24, also using the guide 60, if it is so desired, to prevent saw sway.

After completing this first cut, the knob 48 of the indexing finger is manipulated to lift the indexing finger 44 out of the recess 42 of the clamp 26 and the clamp 26 and gripped stock is rotated 180° relative to the block 10, until the indexing finger drops, under the influence of spring 51, into the opposite recess 42, thus repositioning the stock in the same predetermined axial relation to bed 20. A hacksaw cut is then again made along the same bed 20 until the second cut reaches the same diametrically opposed points on the surface of the stock A.

If desired, after each cut with the hacksaw, a file may be used across the bed 20 to remove burr and to improve the accuracy of the cut.

These two cuts complete the operation for the formation of the male member. The clamp may then be loosened and the stock removed from the bore.

To make the female member B, a second piece of stock of the same cross-sectional dimensions is then inserted into the bore. The clamping operation is the same as that used in the case of the male member and will therefore not be redescribed, except that the clamp fixes the stock in a position to make the cuts intermediate the ends of the stock. After the stock has been fixed by the clamp 26 against axial and rotational movement relative to the block 10, a hacksaw is used along and guided by the bed plate 20 to form an oblique cut down to the line 24. Before the stock is moved the hacksaw is then used to make a cut along and guided by the bed plate 22 until the cut intersects the first cut permitting the removal of the section of the stock shown removed from the stock B in Fig. 1. Again the guide 60 may be used to prevent sway of the hacksaw. In the case of the cut along bed 22, it will be understood that the guide 60, if used, is pivoted through the hacksaw to permit its access to the cutting bed.

In the case of the female member B, the stock is not rotated, both cuts being made while the stock is held in the predetermined position as governed by the position of the clamp 26.

By removing the four bolts 18 and separating the two sections 14 and 16, these two sections may be placed about a pipe or other tubular member that has already been installed or about stock which does not have a free end to insert into the bore 12. The bolts may then be replaced and the cuts made. While, therefore, the device has been called a jig, it is contemplated that it has this additional type of use.

Figs. 8 to 15 illustrate various other joints that can be formed from stock pre-shaped with the use of the jig of the invention.

Figure 8:
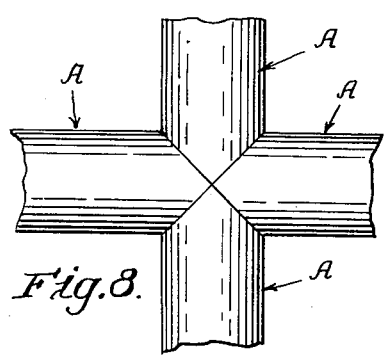
Fig. 8 is a side elevation of a cross joint formed in accordance with this invention.
Figure 9:
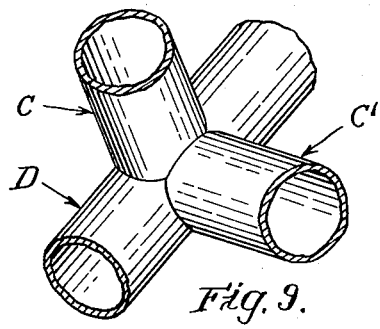
Fig. 9 is a perspective view of a combined cross and T joint.

Fig. 8 illustrates a cross-joint formed of four members A, each of which is pre-shaped in accordance with the instructions given for shaping the member A in making the joint of Figs. 1 to 3.

Figs. 9 to 14 illustrate a four-way joint requiring pre-shaping operations in addition to that described for the preparation of stock for making the joint of Figs. 1 to 3. For the more complicated joint of Figs. 9–14, a member A is pre-shaped as in Fig. 1, but in addition to the two cuts made along the bed 20 in diametrically opposed positions of the stock relative to the block 10, a third cut is made with the stock in a position of rotation relative to the block 10 halfway between the position at which the other two cuts are made, so that the pre-shaped stock will take the form of part C as shown in the upper portion of Fig. 10 having one angularly cut edge 70, a second angularly cut edge 72 and a third angularly cut edge 74, the third cut 74 being made with the stock in the jig at a position half-way between and 45° away from the positions of the stock C relative to block 10 when edges 70 and 72 are cut. The stock is held in this intermediate position by finger 44 cooperating with the intermediate recess 42 in clamp 26.

Figure 10:
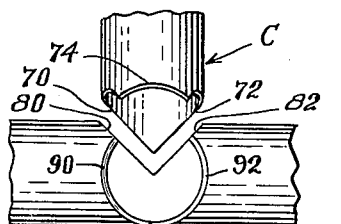
Fig. 10 is an exploded side elevation of two out of the three pre-shaped stock pieces making up the joint of Fig. 9.
Figure 12:
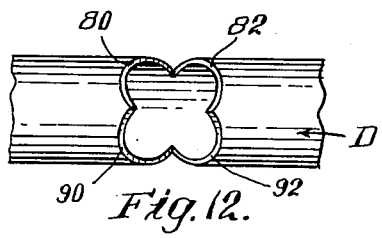
Fig. 12 is an elevation of the piece of stock shown in horizontal position in Fig. 10, but rotated 45° from the position shown in Fig. 10.
Figure 13:
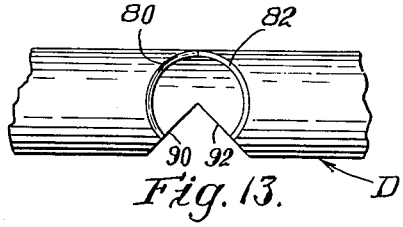
Fig. 13 is a further elevation of the stock piece shown in Fig. 12, but rotated 45° further from the position as shown in Fig. 12 and thus 90° from its position as shown in Fig. 10.

The part D, shown in the lower portion of Fig. 10, is formed by first pre-shaping a piece of stock to the form of member B described in connection with the formation of a joint of the type shown in Figs. 1–3. This operation provides the part D with a V-shaped recess having perpendicularly related cut edges 80 and 82, as shown in Fig. 10. After the completion of these cuts 80 and 82, the stock is rotated in the bore 12, 90° from the position of the first cuts, and two additional perpendicularly related cuts 90 and 92 are then made in the position of 90° rotation. The part D is thus provided with two V-shaped recesses which are 90° inclined one to another, as illustrated in Figs. 10, 12 and 13.

Figure 11:
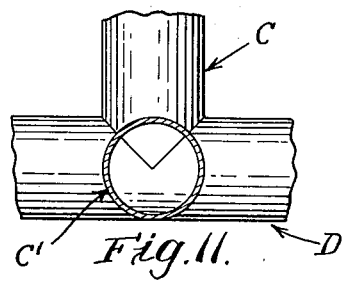
Fig. 11 is a side elevation of the joint shown in Fig. 9.
Figure 14:
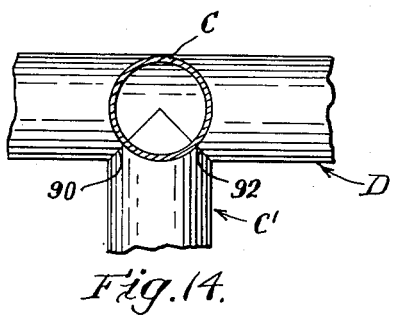
Fig. 14 is a plan of the joint shown in Fig. 9.

Parts C and D are then assembled with edges 70 and 72 of part C abutting edges 80 and 82 of part D and these edges are welded or soldered together. A second part C', prepared in the same manner as part C, is then assembled to complete the joint shown in Fig. 9 by bringing its edges 70 and 72 into abutting relation with edges 90 and 92 of part D and its edge 74 into abutting relation with the similar edge 74 of part C. Fig. 11 shows the assembled joint in side elevation and Fig. 14 shows the assembled joint in plan.

Figure 15:
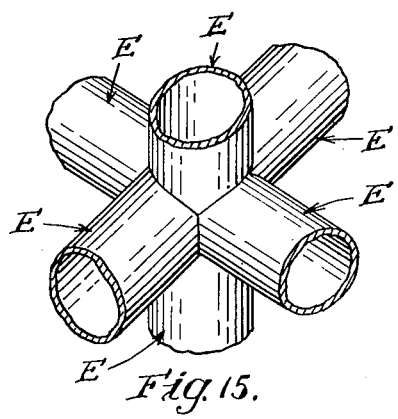
Fig. 15 is a perspective view of a six-way joint formed of members pre-shaped in accordance with this invention.

Fig. 15 illustrates a joint formed by assembling and affixing abutting edges, as by soldering or welding, of six parts each of which has been identically pre-shaped at one end by cutting along the bed 20 at four positions of rotation of the stock relative to the block 10 at 90° intervals. As will be understood, each of the six parts E will have four cut edges like the edge 74 of part C and each edge 74 of each part E will, in the joint of Fig. 15, abut an identical edge 74 of another part E extending at right angles thereto.

As will be understood, a series of these jigs may be provided to accommodate various sizes of stock, or, if it is desired, a jig having a large bore may be readily converted for use on smaller stock by inserting bushings in the bore of the block 10 and split sleeve shims may be placed in the clamp 26.

It will be readily seen that the jig of the invention is adapted for use in cutting solid stock as well as tubular stock. Furthermore, by properly shaping the bore 12, stock of cross-sectional areas departing from the circular may be cut.

One of the features of the invention is that in cutting thin walled stock such as brass tubing, the stock is snugly supported in the bore of the block 10 along all of its surface for a substantial distance each side of the cutting recess. Such support renders less likely damage to the contour of thin-walled stock by pressure exerted during the cutting operation.

It is contemplated that the jig of this invention will find use in making pipe and other joints in fields other than that of electronic equipment, which is referred to merely by way of an example.

I claim:
1. A jig for use in shaping tubular and the like stock preparatory to the formation of angular joints therein comprising a block having internal surfaces defining a longitudinal bore adapted to accommodate stock to be shaped, said block having flat cutting bed surfaces forming a V-shaped recess in said block, said recess-forming surfaces lying in perpendicularly disposed planes and having cut out portions adapting said beds to span a piece of stock inserted through said bore, said surfaces meeting along a line perpendicularly intersecting the axis of said bore intermediate the ends of the bore, and a hinged clamp rotatably mounted on said block for clamping a piece of stock inserted into said bore, said clamp having surfaces forming a plurality of recesses spaced around said clamp, and a movable index finger associated with said block and adapted to enter said clamp recesses for retaining said clamp and stock in a plurality of different positions of rotation relative to said block, whereby different portions of said stock may be successively presented to said cutting bed surfaces without changing the longitudinal position of said stock in said bore.

2. A jig for use in shaping tubular and the like stock preparatory to the formation of angular joints therein comprising a block having internal surfaces defining a longitudinal bore in the block adapted to receive stock to be shaped, said block having cutting bed surfaces forming a V-shaped recess in said block, said recess-forming surfaces lying in perpendicularly disposed planes and having cut out portions adapting said beds to span a piece of stock inserted through said bore, said surfaces meeting along a line perpendicularly intersecting the axis of said bore intermediate the ends of the bore, a guide having a V-shaped cross-section suitably mounted on said block and adapted to be pivoted into said recess, and cooperating stops on said guide and block for positioning said guide in said recess with its V-shaped surfaces substantially parallel to but spaced from said cutting bed surfaces.

THOMAS E. LEGGE.

REFERENCES CITED

The following references are of record in the file of this patent:

UNITED STATES PATENTS

| Number | Name | Date |
|---|---|---|
| 144,406 | Mead | Nov. 11, 1873 |
| 190,042 | Hurd | Apr. 24, 1877 |
| 263,157 | Fox | Aug. 22, 1882 |
| 400,818 | Atwater | Apr. 2, 1889 |
| 1,004,920 | Shire | Oct. 3, 1911 |
| 1,471,593 | Davis | Oct. 23, 1923 |
| 1,521,908 | Schuster | Jan. 6, 1925 |
| 1,582,014 | Kendall | Apr. 20, 1926 |
| 1,787,513 | Cromwell | Jan. 6, 1931 |
| 1,792,481 | Carter | Feb. 17, 1931 |
| 1,915,924 | Coe | June 27, 1933 |
| 1,931,048 | Wiener | Oct. 17, 1933 |
| 2,126,519 | Vogel | Aug. 9, 1938 |
| 2,156,692 | Hixon | May 2, 1939 |
| 2,225,426 | Aronson | Dec. 17, 1940 |
| 2,297,013 | Nichols | Sept. 29, 1942 |
| 2,337,957 | Akins | Dec. 28, 1943 |
| 2,359,350 | Bruno | Oct. 3, 1944 |
| 2,389,679 | Michelson | Nov. 27, 1945 |

FOREIGN PATENTS

| Number | Country | Date |
|---|---|---|
| 207,832 | Great Britain | July 17, 1924 |